United States Patent [19]

Lindstrom

[11] Patent Number: 5,060,068

[45] Date of Patent: Oct. 22, 1991

[54] AUDIO/VIDEO DISTRIBUTION SYSTEM

[75] Inventor: James E. Lindstrom, 47 Pike Dr.-2B, Wayne, N.J. 07470

[73] Assignee: James E. Lindstrom, Wayne, N.J.

[21] Appl. No.: 265,401

[22] Filed: Oct. 31, 1988

[51] Int. Cl.$^5$ .............................................. H04N 5/222
[52] U.S. Cl. ....................................... 358/185; 358/86
[58] Field of Search .................... 358/85, 86, 185, 142, 358/146, 342, 181, 143, 311; 360/14.1

[56] References Cited

U.S. PATENT DOCUMENTS

| | | | |
|---|---|---|---|
| 3,627,914 | 12/1971 | Davies | 358/185 |
| 4,381,522 | 4/1983 | Lambert | 358/86 |
| 4,506,355 | 3/1985 | Dakin et al. | 358/342 |
| 4,506,387 | 3/1985 | Walter | 455/612 |
| 4,516,166 | 5/1985 | Tellone | 360/72.1 |
| 4,635,136 | 1/1987 | Ciampa et al. | 358/342 |
| 4,675,755 | 6/1987 | Baumeister et al. | 360/35.1 |
| 4,724,491 | 2/1988 | Lambert | 358/310 |
| 4,729,044 | 3/1988 | Kiesel | 360/14.1 |
| 4,734,764 | 3/1988 | Pocock et al. | 358/86 |
| 4,751,692 | 6/1988 | Giddings | 358/342 |
| 4,761,684 | 8/1988 | Clark et al. | 358/86 |

FOREIGN PATENT DOCUMENTS 0240794 10/1987 European Pat. Off. ........... 360/14.1

OTHER PUBLICATIONS

Anon; "Television Network Automated by Minicomputer Controlled Channels"; Computer Design, vol. 15, No. 11, pp. 50, 59, 62, 66, 70; Nov. 1976.
Motohashi; "Automatic Program Control System for Television Broadcasting"; NEC Res. and Development, No. 17, pp. 35–45; Apr. 1970.
"High-Level Switcher Interface Improves Editing Techniques", by Bruce Rayner; SMPTE Journal, Aug. 1985, pp. 810–813.
"Vertical-Interval Encoding for Recordable Laser Videodisc", by Donald R. Hayes; SMPTE Journal, Aug. 1985; pp. 814–820.
"Automated Information Systems Appear on Cable TV Scene at Propitious Time"; CM/E Cable Management/Engineering, Jul. 1974, pp. 2, 3, 4, 6, 14 and 18.
"Application of Quadruplex Cassette VTRs in Programming Editing and Production"; by E. S. Busby; Journal of the SMPTE, vol. 83, Oct. 1974; pp. 835–837.
"A Tape Format for Quadruplex Cassette Video Recorders", by E. S. Busby; Journal of the SMPTE, vol. 81; Aug. 1972; pp. 598–600.
"The Design of an Automatic Machine Assignment System", by M. W. S. Barlow; Journal of the SMPTE, vol. 84, Jul. 1975; pp. 532–537.

Primary Examiner—John W. Shepperd
Attorney, Agent, or Firm—Oliff & Berridge

[57] ABSTRACT

A system and method of broadcasting in which both the entire show to be broadcast and segments of the show used as promotional material are retrieved from the same source recordings.

25 Claims, 3 Drawing Sheets

AUDIO/VIDEO DISTRIBUTION SYSTEM

TECHNICAL FIELD

This invention relates to a system and method for the broadcast of pre-recorded shows with insertion of promotional material.

BACKGROUND OF THE INVENTION

Presently, the broadcasting of pre-recorded material entails the use of several tapes of each show and operator intervention to ensure that quality audio and video material is constantly being broadcast (over the air or through cables) to subscribers at remote locations. To broadcast one show over a television channel using conventional techniques, at least one promotional tape is required in addition to the show's master tape(s) in order to provide transmission of television quality video images and to permit the insertion of promotional material between playings of the show. Moreover, repeated play of tapes causes them to stretch, break and wear out, thus necessitating additional back-up tapes and the presence of operating personnel to maintain the quality of the video broadcast and the expected broadcast schedule. Thus, conventional broadcasting methods and systems, even in systems considered automatic, require several copies of pre-recorded material and an operator on duty to resolve malfunctioning tape machines and changes in promotional material. The operating costs of an automatic broadcast system are substantially increased by such maintenance.

The broadcasting of pre-recorded shows with related promotional material is presently accomplished by creating an additional video tape of selected show segments desired to be inserted as promotional spots, often prepared by a movie studio, and storing the prepared video tape in its own video tape playing machine. Depending upon the number of different promotional spots stored on such a video tape and the desired broadcasting order of the spots, several tapes of the promotional spots and respective tape playing machines may be required.

In the broadcast system disclosed by U.S. Pat. No. 4,724,491 to Lambert, a computer retrieves spot messages, but the system requires additional tape(s) and video tape playing machines to enable the broadcast of the spot messages. Additionally, the storing of duplicates of the same recorded material is necessary to run spot messages out of recorded sequence. In contrast, the present invention eliminates the need of creating and/or storing additional video tapes for broadcasting promotional material.

Outside the television broadcast industry, a video disc apparatus providing organized, automatic playback of a series of still pictures is disclosed in U.S. Pat. No. 4,675,755 to Baumeister. Currently two types of video discs are commercially available: constant angular velocity (CAV) and constant linear velocity (CLV) type discs. CAV discs, such as those used in Baumeister's system, store individual still pictures on concentric tracks where one revolution of a disc transmits the stored information of one still picture frame. Hence, CAV discs are rotated at a constant angular velocity in the playing means and are accessed by frame numbers. Other systems using video discs to access at random and transmit still pictures stored in one frame of a constant angular velocity (CAV) disc are disclosed in U.S. Pat. No. 4,635,136 to Ciampa et al. and U.S. Pat. No. 4,737,764 to Pocock et al. However, these prior art systems do not address accessing and inserting segments of a complete show into a broadcast transmission.

CLV video discs store audio/video signal information in tracks of equal (constant) length which are spirally formed from a center of a disc. CLV discs are not rotated at a constant angular velocity, but at a constant linear velocity. Motion pictures are often recorded on CLV discs which are currently available for consumer purchase in video stores and the like.

In the cable television broadcast industry, systems comprising computerized data processors for responding to subscriber selection of a "pay per view" movie by telephone are disclosed in U.S. Pat. No. 4,504,387 to Walter, U.S. Pat. No. 4,381,522 to Lambert and U.S. Pat. No. 4,761,684 to Clark et al. An embodiment of the Clark et al. system employs the use of a laser video disc player to store and access entire selected recordings; but Clark et al. does not address insertion of promotional material.

There still exists a need in the broadcasting service industry for a system and method of programming and operating a television station that is simple and truly automated.

SUMMARY OF THE INVENTION

It is an object of this invention to provide a distribution system for storing and transmitting shows and related promotional material from a self-contained unit that can operate for extended periods of time and enable a television station to schedule and transmit material to remote locations without the need of backup tapes and full-time operators.

It is a further object of this invention to provide a stand alone distribution system for automatically accessing segments of stored show recordings and inserting them as promotional material into slots of a broadcasting schedule.

It is an object of this invention to provide a method of automatically transmitting television signals of broadcast material for an extended period of time without the need or aid of an operator.

It is still another object of the invention to provide a method of creating and automatically inserting promotional material to be transmitted.

It is another object of the invention to achieve the preceding object by retrieving the promotional material from show source recordings and/or using actual promotional logos to provide a viewer with instant identification of the promoted show.

According to the invention, a television programmer can select one or more promotional segments by directly accessing the source recording of the show that is to be broadcast. In a preferred embodiment, a colorized production of a logo or ad slick of a studio motion picture, message characters and full motion and sound are inserted into digitally compressed areas of a video display screen to create promotional material to be broadcast between shows.

BRIEF DESCRIPTION OF THE DRAWINGS

The invention will be described with reference to the figures, wherein like parts are designated by like reference numerals throughout, and wherein.

DETAILED DESCRIPTION OF PREFERRED EMBODIMENTS

The broadcasting system and method of the present invention are conveniently described with reference to transmitting "pay per view" cable television; however the principles of this invention are applicable to other television broadcast systems transmitting pre-recorded events or shows. The term "show" as used herein is defined as a complete broadcast event, including but not limited to movies, situation comedies, dramas, theatrical presentations, sporting events, motion pictures and documentaries. The term "segment" as used herein is defined as a portion or excerpt of a show less than the complete show. The term "source recording" as used herein is defined as the medium upon which a show is recorded, such as an optical laser disc.

The broadcasting method and system of the present invention use playing means and a computer control unit, wherein the playing means play(s) source recording(s) of a show to be broadcast. Promotional segments are played from the same source recording(s). In contrast to known systems and methods, only a single source recording or set of source recordings of each show is needed in order to provide consistent quality video broadcasting of the shows and their respective promotional material.

A source recording of a show to be broadcast is placed in predetermined playing means, a sequence of commands to control operation of the playing means is generated, and the same source recording of the show is accessed to retrieve the stored audio and/or video signal information to broadcast both the show in its entirety and any promotional segments of the show that may be desired. The source recording must be amenable to repeated playings without noticeable wear or distortion. Optical laser discs are preferred, and will occasionally be referred to herein as representative source recordings. However, other non-wearing source recordings such as digital video interactive discs or semiconductor chips may be used.

With this system and method, it is possible to use any segment of a show from any portion of the entire show's source recording as the promotional material. In addition, it is also possible to retrieve and broadcast segments of differing lengths and/or differing subject matter during the time between shows. Only one source recording is required and operator presence is not required.

Figure 1:
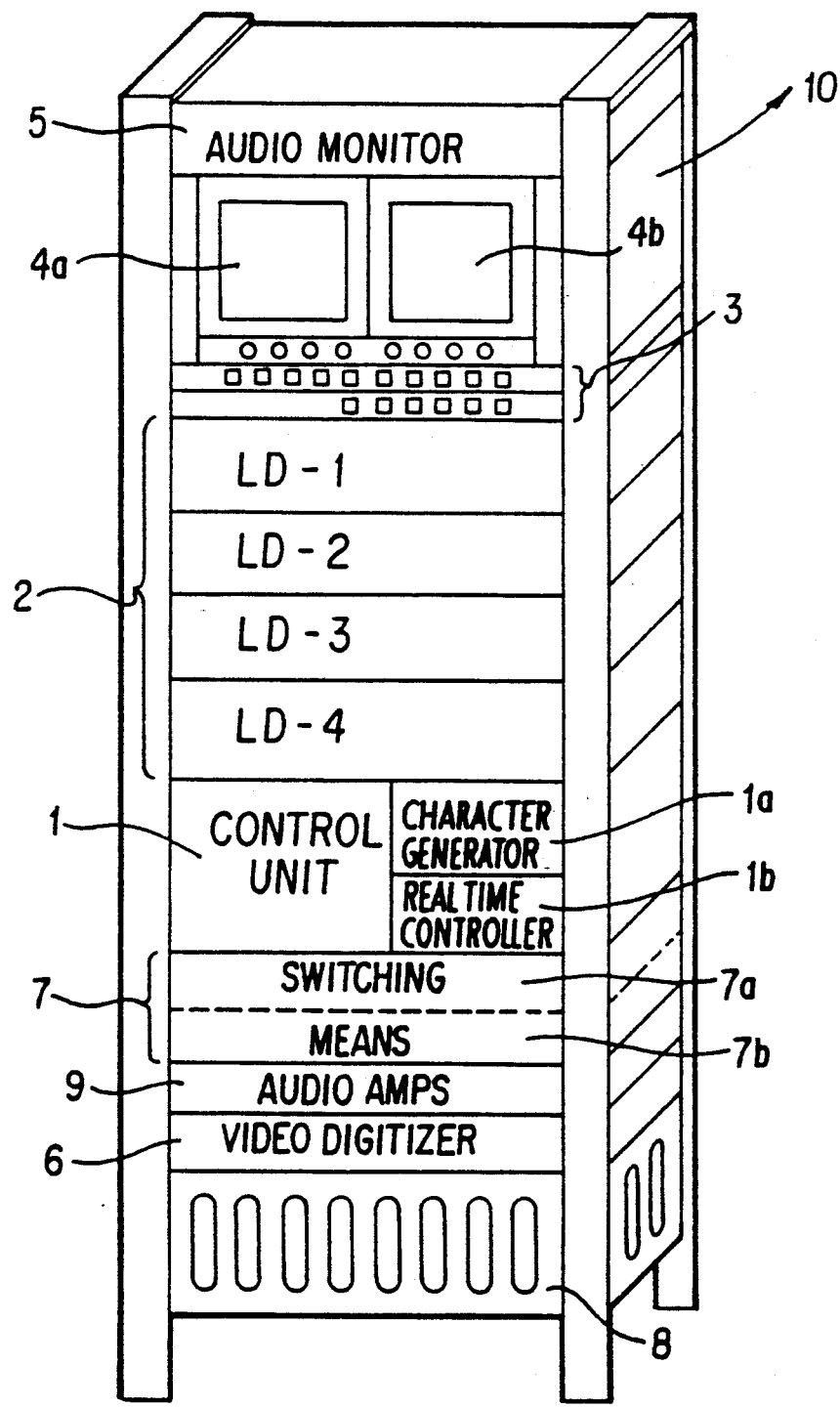
FIG. 1 is a perspective view of a stand alone distribution rack according to the invention.

Referring now to the drawings, FIG. 1 illustrates a stand alone distribution system according to one embodiment of the invention. This system preferably controls one video channel.

The basic inventive system comprises a control unit 1, playing means 2, and switching means 7. To enable broadcast of additional promotional material, a video digitizer 6 and a character generator 1a can be added. Other optional equipment includes video monitors 4a, 4b and audio monitor 5.

The preferred self-contained unit of FIG. 1 utilizes optical laser disc technology for storage and retrieval by random access of pre-recorded shows. In this preferred embodiment, four laser disc players LD-1, LD-2, LD-3 and LD-4 with one-hour optical discs are combined with a control unit 1 in one rack 10 to allow a television broadcaster either to alternate between four shows having a maximum playing time of one hour, two shows having a maximum playing time of two hours, to play a single show having a playing time between two and four hours or a combination of the above.

The control unit 1 may include a real-time controller 1b, and may also include the character generator 1a. The control unit 1 retrieves shows or segments by commanding a laser disc player to access any predetermined point on source recordings in the individual laser disc players, and commands the switchers 7a, 7b to automatically transmit those signals to the video channel. Each laser disc player is connected to a separate input of audio/video switchers 7a, 7b (preferably 12×1 switchers), enabling the selection of either program or promotional broadcast by the control unit 1. The switchers 7a, 7b are controllable by either control unit 1 or optional video panel switchers 3 which will provide the system's user with manual control over disc player selection.

Figure 2:
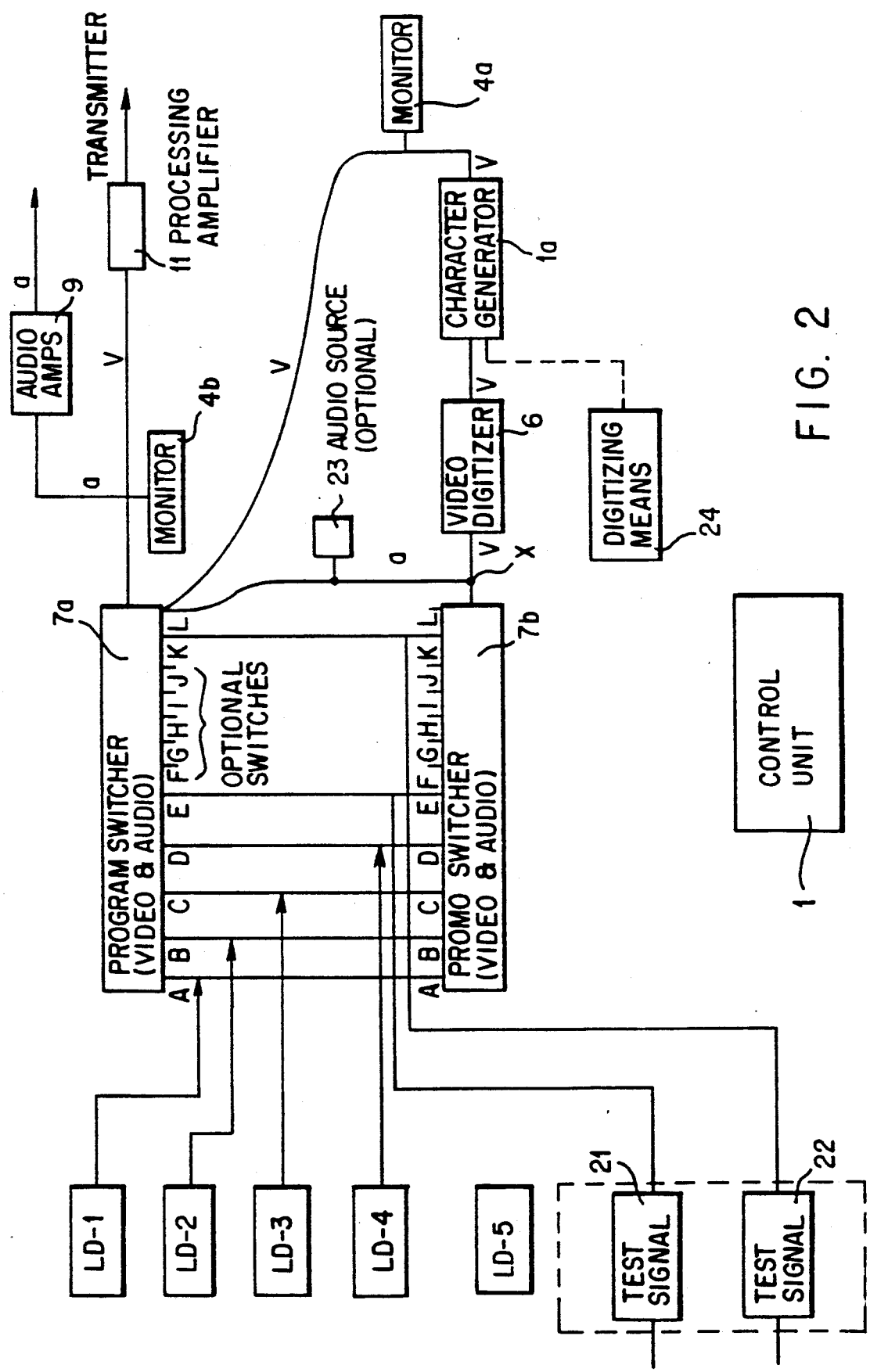
FIG. 2 is a schematic diagram of a stand alone distribution system according to the invention.

The rack optionally includes two color monitors 4a, 4b. As shown in FIG. 2, monitor 4a displays the promotional material which, when desired, can be broadcast to all viewers. Monitor 4b displays the final video output of the system. An audio monitor 5 permits the quality of sound to be monitored.

Both character generator 1a and the real time controller are optionally contained in the control unit 1, which is preferably one manufactured by Video Data Systems of Hauppauge, New York as the System 2000 (TM). This character generator formats promotional information in various fonts and character sizes, and can store digitally formatted artwork to create titles and pictures using artwork such as promotional artwork supplied by movie studios. The real-time controller provides a clock by which all operations can be precisely synchronized to control broadcast of a show and promotional material. The clock of the real-time controller provides real calendar time (i.e., year, month, day) and the broadcast schedule is based on this.

The above components are combined in a single rack 10 which can provide a self-contained transmitting station for a continuous broadcast without the need of human intervention. A circulator blower fan 8 can be incorporated in the bottom of the rack to provide a flow of cool air between components.

This system is programmed by inserting source recordings, such as optical laser discs, having one or more shows recorded thereon, into respective commercially available playing means such as laser disc players, and inserting a memory device such as a computer floppy disc in the control unit 1. The memory device contains a program which generates all commands and operating controls of the system. Alternatively, the program can be supplied to a memory device (e.g., solid state or floppy disc) in the control unit through known means such as a telephone modem.

Referring to FIG. 2, a schematic diagram of a stand alone distribution system illustrates how the audio/video signals are transmitted to produce both the program and promotional broadcast. The control unit 1 is in communication with substantially every element of the distribution system in a manner which would be readily understood by one of ordinary skill in the art; but for reasons of clarity the connections are not shown.

As mentioned above, each laser disc player is electrically connected to switchers 7a, 7b for transmission of audio and video signal information. Laser disc players LD-1, LD-2, LD-3 and LD-4 are connected to the respective inputs A,B,C,D of both the program switcher 7a, and the promotional switcher 7b.

A color bar test signal 21 and a black burst test signal 22 can also be fed into both switchers 7a, 7b at inputs E and K, respectively, to provide proper background video signals and other features as known in the art. The test can be produced by the control unit or can be input from outside the self-contained rack, and are enclosed within the dotted lines to indicate that option. As shown in FIG. 2, additional input switches F,G,H,I and J remain available for optional equipment that may be desired. For example, additional laser disc player(s) LD-5 or other playing means may be added as shown in FIG. 2.

The computer control unit 1 preferably includes a genlock circuit. Control unit 1 determines slightly in advance of the predetermined playing time, preferably two minutes, which laser disc player is to be activated. This short time allows the player to start up, search the disc and begin playing ahead of transmission time to facilitate genlock, which is the correlation of time between playing means so that transmission from each disc is precisely time synchronized. As a result of genlock, high quality video broadcast continues during the changing of discs.

Promotional material is retrieved directly from the source recordings in the laser disc players, and is transmitted to remote locations without the need of a separate promotional source recording. The computer control unit 1 generates the commands which determine the segments to be retrieved for promotional material. Of course, additional promotional materials could also be provided from additional sources of any known kind, if desired.

The video output (v) of the promotional switcher 7b may pass through a video digitizer 6 and the audio output (a) may be sent to audio input L of the program switcher 7a. The video signal and audio signals of the source recordings are thus split at point X. Alternatively, an optional second audio source 23 may be fed into audio input L of the program switch. The second audio source can permit audio transmission from recorded material, an announcer, or other transmitted audio material.

The video digitizer in a preferred embodiment, such as the WJ-450 manufactured by Panasonic, can create a digitally compressed screen having separate image areas. Selected segments can be transmitted into selected ones of such areas. Furthermore, promotional video images retrieved from the source recording can be freeze-framed by the digitizer to be inserted into any one of the areas on the display screen in conjunction with, or between playings of, promotional material from the source recording. Additionally, control unit 1 can insert retrieved video images in full motion into such areas of the screen.

Figure 4:
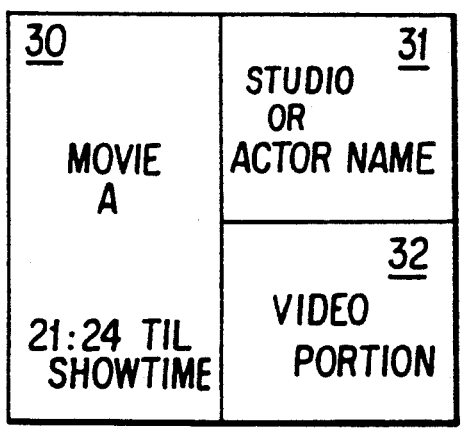
FIG. 4 is a display screen of interstitial promotional material according to the invention.

Referring now to FIG. 4, a schematic video display screen is shown to illustrate the use of the inventive system and method. The video digitizer 6 can produce a screen with any number of compressed video areas. Preferably, the digitizer 6 produces a screen divided into four quadrants. As shown in FIG. 4, block 30 is comprised of two quadrants, with blocks 31 and 32 each being a quadrant. Additionally, the control unit 1 can insert still frame promotional images such as a movie logo, as well as full motion and sound into any of the quadrants.

From the video digitizer, the video signals are sent to the character generator 1a for possible insertion of additional message information. The character generator can store studio motion picture logos which are digitally formatted by conventional means, such as by a digitizer 24 scanning black/white pictures which are then colorized. In addition, the character generator can create the title of the featured show which is inserted by the control unit in a block such as block 30. The character generator can similarly create messages (such as "Order Now!") and a countdown display. In FIG. 4, a full or still motion video advertisement using a retrieved portion of a stored source recording of a show may be played in block 32. The promotional material created by the digitizer and character generator can be confirmed on monitor 4a, for example, while a show is being broadcast.

The audio and video signal information of shows and promotional material are sent through the program switcher 7a to the transmitter of the cable system as shown in FIG. 2. Additionally, the complete broadcast can be viewed on monitor 4b.

As shown in FIG. 2, a processing amplifier 11 and audio distribution amplifier 9 are optionally connected to the video output and audio output, respectively, of the distribution system to correct any abnormalities and distortion in the video or audio signals in order to produce true broadcast quality. The audio and video signals are combined, as known in the art, prior to transmitting the broadcast. The audio may be transmitted in stereo.

In the preferred embodiment, the shows are recorded on optical laser discs, preferably of the constant linear velocity (CLV) type, although other discs may be used. The laser disc players are capable of playing constant angular velocity (CAV) and/or constant linear velocity (CLV) optical laser discs. CLV discs are readily available consumer-style discs and are much less expensive than conventional broadcast quality video tapes, especially since only one disc is needed in place of several duplicate tapes. Furthermore, CLV discs are more cost efficient since CLV discs can hold twice as much information as CAV discs.

Figure 3:
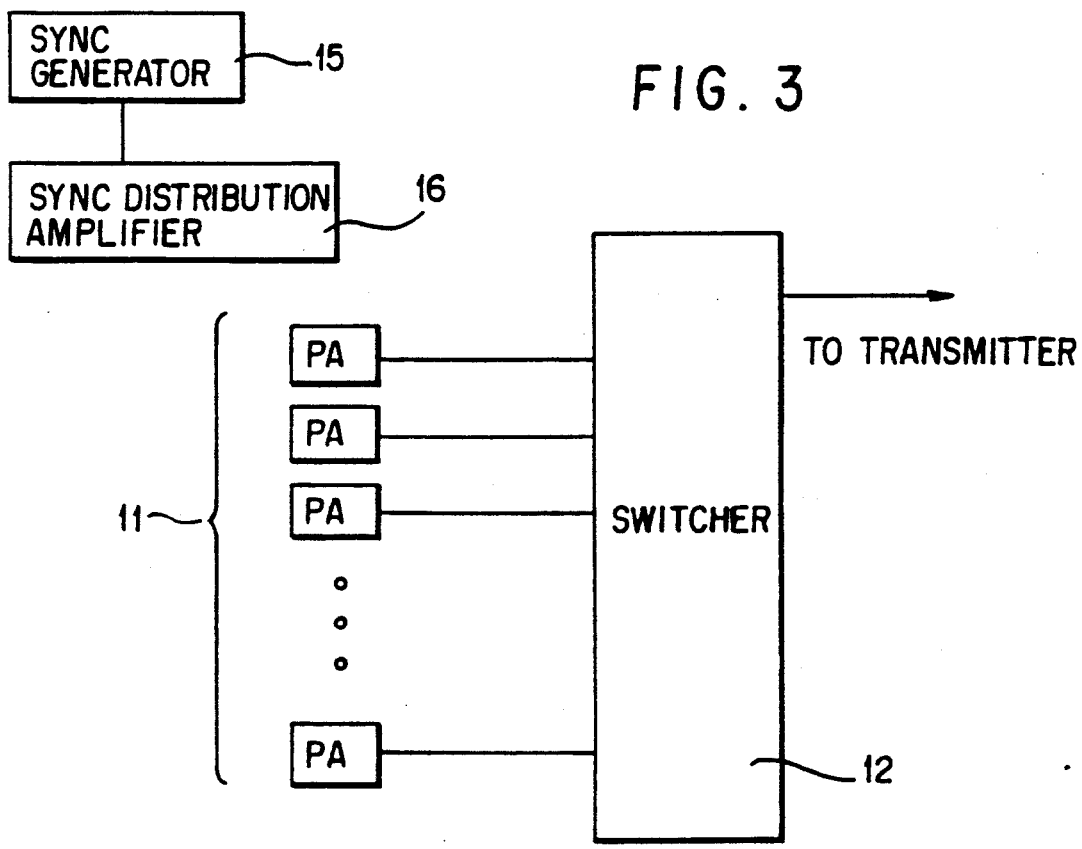
FIG. 3 is a schematic diagram of another embodiment of the system employing a common rack to couple together a plurality of racks of FIG. 1.

In another embodiment of the present invention, several stand alone distribution systems of the type shown in FIG. 1 are coupled together and joined with a common rack which includes a master sync generator for the system. This arrangement is schematically shown in FIG. 3.

This arrangement enables a cable television system to schedule several different shows to be broadcast over an extended period of time, for example one month. For example, ten system racks of FIG. 1, when coupled together, provide the user with the capability of broadcasting 20 different shows of two hours or less on up to 10 different video channels, even assuming that each playing means could only store up to 60 minutes of a show and assuming that each rack contains only four playing means.

The programmed control units provide the monthly broadcast schedule of shows and generate the commands and operating controls. In order for each rack to operate, the schedule of events to be broadcast must be programmed in a control unit, such as in a floppy disc, using conventional programming techniques. In the multi-rack system, the processing amplifier 11 of each individual rack is electrically connected to a switcher 12. A sync generator 15 acts as the master control center to synchronize the system. The sync generator may also produce color bar and black burst test signals. Optionally, this arrangement may include a sync distribution amplifier 16 which acts as a buffer to provide extra driving capacity for the sync generator 15 when a large number of racks is used. The sync generator 15 is in communication with substantially every element of the system diagrammatically shown in FIG. 3 in a conventional manner; but for reasons of clarity these connections are not shown.

The control unit of a system of the present invention can be programmed by a remote central control station. From such a central control station, the video and audio broadcast quality can also be monitored, and if necessary, the monitored system can be reprogrammed by the central control station. This feature further lessens the need for a full-time operator as the entire period of broadcast is pre-recorded, stored in an unmanned distribution system, automatically operated by an unmanned control unit, and monitored and adjusted and/or reprogrammed by a central control station. A single central control station can oversee numerous systems of the invention, e.g., by use of telephone lines and modems.

The optical laser disc technology and real time switching capabilities of the preferred embodiment allow random access to any point on each disc, and repeated play does not add stress on either the player or the disc, and significant mechanical maintenance is avoided.

EXAMPLE

In accordance with a preferred embodiment, a programmed floppy disc generates the commands and controls operation of the system. Using conventional programming techniques, an extended broadcast, preferably for one month, is programmed into the distribution system so that the broadcast is automatically transmitted to remote locations. In this example, the floppy disc is programmed to alternate between two movies. A system user inserts laser discs into players #1 and #2 which contain Side 1 and Side 2 of Movie A, respectively, and laser discs into players #3 and #4 example, Movie A is to be transmitted for broadcast at 12 noon, 4 PM, and 8 PM and movie B is to be broadcast at 2 PM, 6 PM, and 10 PM. Both movies are less than two hours long; Movie A is one hour, 47 minutes and 32 seconds long. Since the movies will not end in precise two hour intervals, there will be time periods between shows during broadcasting. Therefore, interstitial material needs to be programmed as well.

As this embodiment of the invention employs the use of CLV optical laser discs, the stored program material is accessed by a laser disc player time code indicating minutes and seconds, such as 45:23. (If CAV discs were used, access could be achieved by frame location.) A floppy disc to be inserted into the control unit is programmed by indicating the time of day the laser disc players are to be activated, and the time codes of the segments of program material which are to be retrieved. In the example above, at 12 noon laser disc player #1 will begin transmitting Side 1 of Movie A; at 12:58 p.m., laser disc player #2 will be activated to begin searching for the beginning of Side 2 of Movie A and to provide time for synchronization the players. The two minute interval is more than adequate time to facilitate genlock so that the retrieved beginning frame of Side 2 will be set to begin playing at exactly 1:00 p.m. Genlock ensures that the change from player 1 to player 2 is smooth with no "jumping" produced in the transmitted video screens. At the end of Side 1, transmission from player #2 will begin.

At the end of Side 2 of Movie A, at 1:45:32 p.m., the control unit will activate the components necessary to produce interstitial promotional material. Here, character generator output is transmitted. Then, to produce the display screen of FIG. 4, a predetermined laser disc player will be activated two minutes before the segment is to be transmitted. In this promotional video, a segment(s) of Movie B will be broadcast.

As described above, the floppy disc is programmed to retrieve segments of varying lengths from either Side 1 or Side 2 of Movie B. The program on the floppy disc also causes the control unit to provide commands to video digitizer 6 and character generator 1a. The video digitizer, when activated, provides the screen with four compressed image areas; the control unit then retrieves one or more segments from laser disc player #3 or laser disc player #4 and inserts the retrieved segments into block 32. A segment of Movie B is accessed by time codes 45:13–47:10 and is retrieved from player #3 and played in block 32; the title is generated by the character generator, as well as the message "[minutes]:-[seconds]til showtime", and both are inserted into block 30; and the third block 31 displays the logo originally provided on paper by the producing studio.

During the twelve minute and twenty-eight second interval of the above example, several video segments retrieved from player #3 or player #4 are inserted into one of the compressed image areas formed by video digitizer 6. The program of the floppy disc causes the control unit to command activation of each player containing the predetermined segment two minutes before expected transmission. Then at 1:58 p.m., the control unit commands activation of player #3 to search for the beginning of the disc and at 2:00 p.m. will begin transmitting from player #3. The floppy disc is programmed in the above manner for each scheduled broadcast of Movies A and B. Between the end of Movie B and the beginning of Movie A, promotional material including segments of Movie A (or of both movies) is played. The interstitial material is also programmed so that the complete daily schedule will be broadcast on a real time basis. Thus, this broadcasting system enables both the entire show and promotional segments to be transmitted from laser discs inserted in the players without the need of creating a prepared promotional video disc. Moreover, the promotional material created by the system provides viewers with instant identification of the promoted shows.

From the foregoing description it will be apparent that the instant audio/video distribution system and method provide the broadcast service industry with a television programming and operating system that is simple and truly automated. The operation of the system can be as simple as inserting source recordings into playing means and a floppy disc into a control unit. Even the floppy disc can be eliminated since the control means can be programmed, e.g. by telephone, by a central control station.

What is claimed is:

1. A system for transmitting audio-video signals to a broadcasting system, comprising:

at least one playing means for playing a show which is pre-recorded in a pre-defined continuous and coherent edited sequence on at least one source recording which is amenable to repeated playings without noticeable wear or distortion and which contains at least a substantial portion of the show, wherein different recorded material is provided on each said source recording;

control means programmed to transmit said show in its entirety and separately and repeatedly to select and transmit at least one promotional segment of said show previous to or following the entire transmission of said show from the same source recording;

wherein said control means is programmed to access any point of the source recording and to retrieve any length of segment from the source recording in accordance with a programmed schedule.

2. The system according to claim 1, wherein the control means is programmed to select and transmit a plurality of segments from the same source recording.

3. The system according to claim 1, wherein the playing means comprises at least one optical laser disc player.

4. The system according to claim 1, wherein said control means is programmed to play said entire show a plurality of times.

5. A system according to claim 1, wherein said show is recorded on a single source recording.

6. A method of transmitting audio-video signals to a broadcasting system, comprising:

transmitting from a single source recording or single set of source recordings to said broadcasting system at least one entire show which is pre-recorded in a pre-defined continuous and coherent edited sequence on said source recording or set of source recordings, said source recording or set of source recordings being amenable to repeated playings without noticeable wear or distortion, at least one said source recording containing at least a substantial portion of the show, and different recorded material being provided on each said source recording; and separately and repeatedly transmitting from the same source recording or set of source recordings to said broadcasting system at least one promotional segment of said at least one show of any length from any point of the source recording, previous to or following the entire transmission of said show;

both said transmissions being performed in accordance with an electronically pre-programmed schedule.

7. The method according to claim 6, wherein a plurality of segments of said at least one show are transmitted from the same source recording to a display screen.

8. The method according to claim 6, further comprising playing said entire show a plurality of times.

9. A method according to claim 6, wherein said show is recorded on a single source recording.

10. The method according to claim 6, wherein said source recording is at least one optical laser disc.

11. A system for transmitting audio-video signals to a broadcasting system, comprising:

a plurality of playing means for playing at least one show which is pre-recorded in a pre-defined continuous and coherent edited sequence on a plurality of source recordings which are amenable to repeated playings without noticeable wear or distortion, each of the plurality of source recordings containing different recorded material and at lest one said source recording containing at least a substantial portion of the show;

control means programmed to transmit said show in its entirety and separately and repeatedly to select and transmit at least one promotional segment of said show previous to or following the entire transmission of said show from the same plurality of source recordings.

12. The system according to claim 11, wherein said control means is programmed to transmit said show in its entirety and separately to select and transmit a plurality of segments of said show previous to or following the entire transmission of said show from the same source recording, and to select and transmit said segments from any one of said plurality of playing means by random access.

13. The system according to claim 11, wherein all of said plurality of playing means are optical laser disc players.

14. The system according to claim 11, wherein said control means is programmed to play said entire show a plurality of times.

15. A system for transmitting audio-video signals to a broadcasting system, comprising:

at least one playing means for playing a show which is pre-recorded in a pre-defined continuous and coherent edited sequence on at least one source recording which is amenable to repeated playings without noticeable wear or distortion and which contains at least a substantial portion of the show;

control means programmed to transmit said show in its entirety and separately and repeatedly to select and transmit at least one segment of said show previous to or following the entire transmission of said show from the same source recording; and an audio source other than the source recording.

16. A system for transmitting audio-video signals to a broadcasting system, comprising:

at least one playing means for playing a show which is pre-recorded in a pre-defined continuous and coherent edited sequence on at least one source recording which is amenable to repeated playings without noticeable wear or distortion and which contains at least a substantial portion of the show;

control means programmed to transmit said show in its entirety and separately and repeatedly to select and transmit at least one segment of said show previous to or following the entire transmission of said show from the same source recording; and means for generating selected characters.

17. A system for transmitting audio-video signals to a broadcasting system, comprising:

at least one playing means for playing a show recorded on at least one source recording;

control means programmed to transmit said show in its entirety and separately to select and transmit at least one segment of said show previous to or following the entire transmission of said show from the same source recording; and means for transmitting said at least one segment so that it appears in a first portion of a video screen of a subscriber of said broadcasting system and not in remaining portions of said video screen.

18. The system according to claim 17, further comprising means for generating selected characters, and means for inserting the generated characters onto a second portion of said video screen.

19. The system according to claim 18, wherein the means for inserting the generated characters is adapted to insert said characters onto said second portion while said at least one segment is appearing in said first portion.

20. A system according to claim 18, wherein the control means determines when the entire show, said at least one segment and said characters will be transmitted.

21. The system according to claim 18, further comprising means for digitizing pictures from hard copy and inserting said digitized pictures onto a portion of said video screen.

22. A method for transmitting audio-video signals to a broadcasting system, comprising:
   transmitting from a source recording to said broadcasting system at least one show recorded on said source recording; and
   separately transmitting from the same source recording to said broadcasting system at least one segment of said at least one show previous to or following the entire transmission of said show; and
   transmitting said at least one segment into at least one of a plurality of compressed video areas of a display screen.

23. The method according to claim 22, further comprising generating a sequence of selected characters to form at least one message, and inserting said at least one message in at least one said compressed video area.

24. The method according to claim 22, wherein a first said segment of said show is inserted into a first said compressed video area of said display screen, and a second said segment of said show is inserted into a second said compressed area of said display screen.

25. The method according to claim 22, wherein a single frame of said show from said source recording is inserted into at least one said compressed video area.

* * * * *